Nov. 16, 1937.    R. F. PEO    2,099,227
AIR COOLING UNIT FOR AUTOMOTIVE VEHICLES
Filed Oct. 7, 1935    2 Sheets-Sheet 1

Inventor
Ralph F. Peo

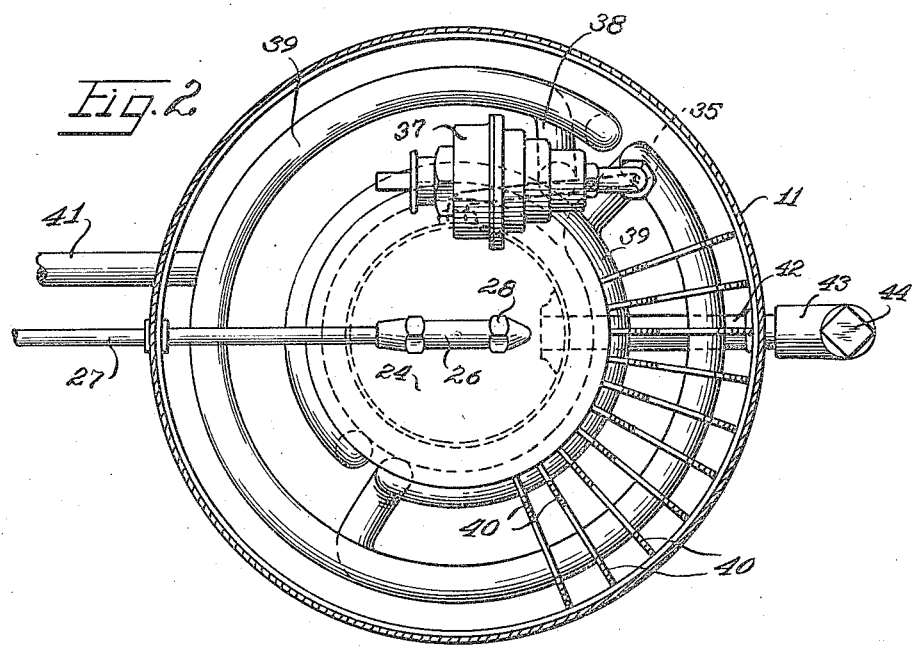
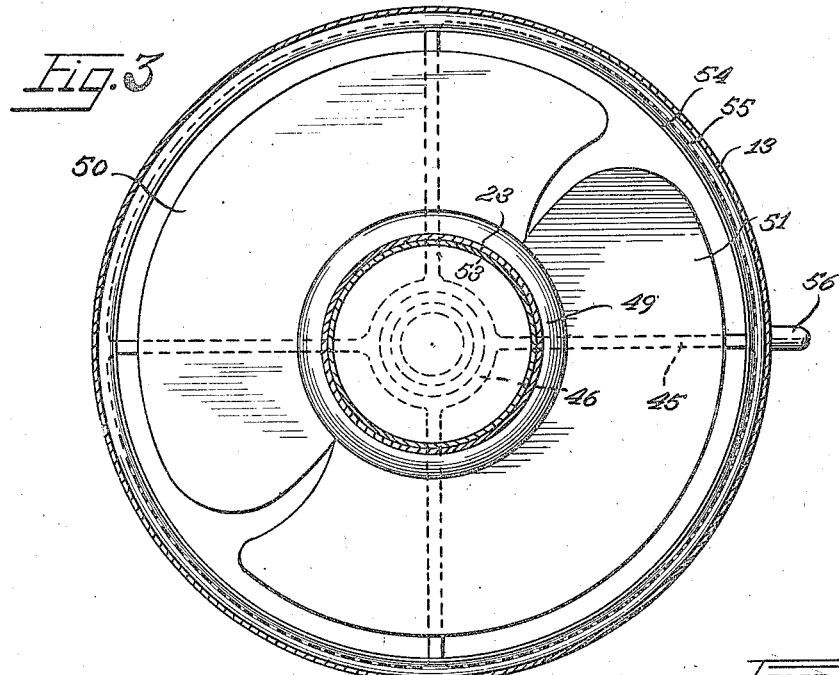

Patented Nov. 16, 1937

2,099,227

UNITED STATES PATENT OFFICE 2,099,227

AIR COOLING UNIT FOR AUTOMOTIVE VEHICLES

Ralph F. Peo, Buffalo, N. Y., assignor to Houde Engineering Corporation, Buffalo, N. Y., a corporation of New York Application October 7, 1935, Serial No. 43,845

8 Claims. (Cl. 62—102)

This invention relates to an air conditioning evaporator unit adapted to be mounted behind the dashboard of an automotive vehicle and to circulate conditioned air throughout the interior of the vehicle.

More specifically, this invention relates to a compact, combination liquid refrigerant receiver and evaporator unit, preferably provided with a dehydrator to absorb moisture from the refrigerant together with fluid propelling means to circulate air or other fluid around the evaporator coils for conditioning the fluid.

In the air conditioning of automotive vehicles, it is desirable to use a compact heat transfer unit which efficiently absorbs heat from air propelled through the unit.

I have now provided such a unit for mounting behind the dashboard of an automotive vehicle in an out-of-the-way space not forming a part of the occupied area in the vehicle. The unit efficiently circulates conditioned air throughout the entire interior of the vehicle.

My evaporator unit is preferably operated with a non-inflammable refrigerant which is liquid at ordinary temperatures, such as, for example, methylene chloride ($CH_2Cl_2$). The refrigerating system used with my evaporator unit is of the expanded refrigerant or dry type in which liquid refrigerant is stored in a reservoir mounted within the unit. The refrigerant is drawn from the reservoir as needed into the low or vacuum side of the refrigerating system and passes through an expansion valve mounted near the top of the unit where it is gasified and circulated through the cooling coils to absorb heat from the air which is propelled around the outside of the coils by a fan mounted at the bottom of the unit. The conditioned air is then directed into the occupied area of the vehicle.

It is, then, an object of this invention to provide a compact and efficient evaporator unit for mounting in an automotive vehicle.

A further object of this invention is to provide an air conditioning evaporator unit for mounting behind the dashboard of an automotive vehicle.

A further object of this invention is to provide a combination liquid refrigerant reservoir, dehydrator and evaporator unit.

A further object of this invention is to provide a compact air-cooling unit of the dry type which can be mounted behind the dashboard in an automotive vehicle.

Other and further objects of this invention will become apparent from the following detailed description of the annexed sheets of drawings, which illustrate a preferred embodiment of this invention.

On the drawings:

Figure 2 is a cross-sectional view, with parts in elevation, taken substantially along the line II—II of Fig. 1.

Figure 3 is a cross-sectional view, with parts in elevation, taken substantially along the line III—III of Figure 1.

As shown on the drawings:

Figure 1:
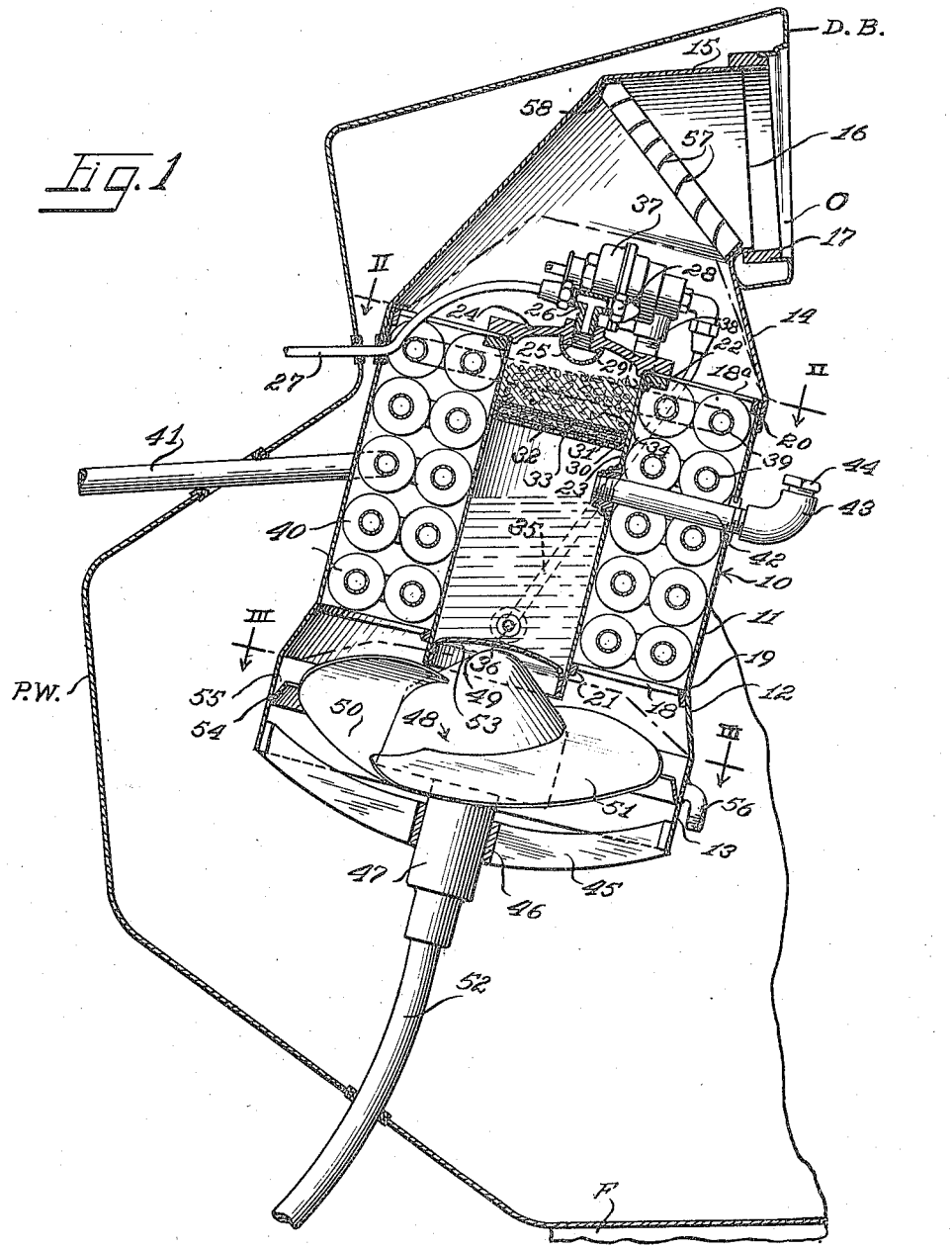
Figure 1 is a vertical cross-sectional view, with parts in elevation, illustrating an evaporator unit of this invention mounted behind the dashboard of an automotive vehicle.

In Figure 1, the reference character P. W. indicates the partition wall commonly used between the motor compartment and the passenger compartment of an automotive vehicle. The reference character F indicates the floor of the automotive vehicle, while the reference character D. B. indicates the dashboard of the automotive vehicle.

According to this invention, the air cooling unit 10 is mounted behind the dashboard D. B. adjacent to the partition wall P. W. and propels conditioned air through an opening O formed in the dashboard D. B.

The evaporator unit is housed within a cylindrical metal casing 11 which is flared out near the bottom thereof as at 12 to define an enlarged circular bottom portion 13. A funnel-shaped member 14 is secured to the top of the casing 11. The member 14 is provided with a horizontally extending portion 15 defining an opening 16 communicating with the opening O in the dashboard D. B. A rubber collar or bushing 17 is disposed around the opening 16 over the outer periphery thereof and fits into the opening O of the dashboard, thereby connecting the portion 15 of the member 14 with the dashboard opening.

The casing 11 carries a pair of spiders 18 and 18a at the top and bottom thereof. The spiders 18 and 18a are secured to the inside of the casing 11 as shown at 19 and 20 by soldering, brazing or welding.

The spiders 18 and 18a define annular collars 21 and 22, respectively, for receiving therethrough a tubular receptacle 23 to hold the same rigidly with respect to the casing 11. If desired, the receptacle 23 may be soldered, brazed or welded to the collars 21 and 22 or may merely be held in tight frictional engagement with the collars.

The top of the receptacle 23 is closed by a cover 24 having a threaded boss 25 formed in the center thereof for receiving a T-shaped coupling 26.

A tube 27 is connected to the coupling 26 for passing a refrigerant from the condenser of the refrigerating system into the receptacle 23. The other end of the T-shaped coupling 26 has a detachable cap or plug 28 secured thereon for permitting a purging of the system through the coupling without requiring removal of the coupling from the cover 24.

The cover 24 carries a fine mesh screen 29 which is disposed over the opening through the boss 25 for filtering the incoming refrigerant and to prevent the dehydrating material therebelow from getting into the refrigerant line. A perforated metal strainer 30 is secured to the inside walls of the receptacle 23 near the top thereof and supports a fine mesh screen 31. A felt disc 32 is disposed over the screen 31, and the felt 32, in turn, is covered by one or more fine mesh wires 33.

Dehydrating material 34, such as aluminum oxide or the like, is disposed over the screen 33. The incoming refrigerant from the tube 27 thereby is filtered through the screen 29 and passes through a mass of dehydrating material 34 where any moisture in the refrigerant is removed. The dehydrated refrigerant is then filtered through the fine mesh screens 33 and 31 and the felt disc 32 into the lower part of the receptacle 23. A tube 35 communicates with the bottom of the receptacle 23 as at 36 for withdrawing the refrigerant from the container into an expansion valve 37 mounted on top of the container. The reduced pressure side of the expansion valve 37 is connected with a tube or pipe 38 communicating with cooling coils 39 which are sinuously wound around the receptacle 23 and within the casing 11 in any suitable manner to define an inner and outer row of coils.

The cooling coils 39 have radiating fins 40 secured thereon, as shown, to provide enlarged surfaces of contact for the air to be cooled which is circulated therearound. The end of the coils 39, as shown in Figure 1, is in the middle of the coils and is connected with a return conduit or tube 41 for returning the expanded and spent refrigerant to a vacuum pump and compressor, from which it is fed into a condenser for recirculation back through the tube 27 into the receptacle 23. When refrigerants such as methylene chloride are used, the low side of the refrigerating system, including the cooling coils, is maintained under less than atmospheric pressure, while the high side of the system, including the refrigerant in the liquid receptacle 23 is maintained at atmospheric pressure or at pressures slightly above atmospheric pressure.

A filler pipe 42 communicates with the receptacle 23 at a point slightly above the normal liquid level of refrigerant in the receptacle. The filler pipe 42 extends through the casing 11 and has an elbow 43 secured thereon which may be closed by a plug 44. Refrigerant can thus be readily supplied to the receptacle in the event of loss or leakage during operation of the device.

The refrigerant stored in the receptacle 23 is kept in liquefied form since it is in heat transfer relation with the cooling coils. Therefore, since the expansion valve 37 is in communication with the bottom of the receptacle 23 it is constantly flooded with liquid refrigerant rather than with flash gas and functions more efficiently to give maximum heat absorption in the cooling coils as the liquid is flashed on the low side of the system.

The valve 37 is in the path of air to be circulated into the vehicle and any cooling of the valve by immediate flashing of the refrigerant on the low side thereof is utilized to further cool the air.

The portion 13 of the casing 11 carries a spider 45 at the bottom thereof. The spider 45 has an annular bushing 46 formed in the center thereof for receiving the shaft 47 of a fan 48 in bearing relation. Anti-friction bearings (not shown) may be disposed between the bushing 46 and the shaft 47. The fan 48 comprises a conical shaped center portion 49 having two helical fan blades 50 and 51 secured thereon. The fan 48 may be driven by a flexible shaft 52 secured at its end in the shaft portion 47 of the fan. The flexible shaft 52 may be connected to any driving part of the automobile motor, and is preferably connected to the front end of a governor clutch, such as is described and claimed in my copending application Serial No. 24,307, filed May 31, 1935. If desired, however, a small electric motor may be used to drive the fan and may be directly connected to the shaft portion 47 of the fan.

The apex of the conical portion 49 of the fan fits into the upturned bottom 53 of the receptacle 23. The fan blades 50 and 51 of the fan extend into close proximity with an upturned rim 54 secured on the inside of the portion 13 of the casing 11, as shown, to define a trough 55. With this construction, any condensed moisture which drips from the coils 39 is thrown outward by the fan into the trough 55. The trough 55 can readily be drained through a nipple 56 which may be in communication with a drain pipe (not shown) leading to the outside of the vehicle body.

It is thus evident that the fan receives air from near the bottom of the automotive vehicle and propels this air upwardly over the cooling coils 39, where it is cooled and conditioned. The cooled air then passes around a plurality of baffle plates 57 secured in an annular collar 58 which is attached to the funnel-shaped member 14. The baffle plates 57 direct the air outwardly through the openings 16 into the upper portion of the automotive vehicle. The cooled air then circulates throughout the entire vehicle to lower the temperature therein and is again recirculated through the fan.

With the air conditioning unit of this invention in operation in an automotive vehicle, all of the windows of the vehicle may be closed, and the infiltration of fresh air through the cracks and crevices of the vehicle will be sufficient to supply fresh air to the occupants.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. An evaporator unit adapted to be mounted behind the dashboard in an automotive vehicle comprising a casing having an air inlet and outlet, cooling coils in said casing between said inlet and said outlet, a receptacle for refrigerant in said casing in heat transfer relation with said coils, and means for expanding refrigerant from said receptacle into said coils.

2. An evaporator for use in conditioning air in automotive vehicles comprising a casing having an air inlet and outlet, cooling coils in said casing between said inlet and said outlet, a receptacle for refrigerant in said casing in heat transfer relation with said coils, means in said casing for expanding refrigerant from said receptacle into said coils, and means for propelling air around said coils and said expanding means and through said outlet for circulation through the automotive vehicle.

3. An evaporator unit comprising a casing having an inlet at the bottom thereof and an outlet at the top thereof, a receptacle for refrigerant in said casing, cooling coils in said casing around said receptacle, a dehydrating compartment in said receptacle, means for feeding refrigerant through said dehydrating compartment into the bottom of said receptacle, an expansion valve above said receptacle, means for feeding refrigerant from the bottom of said receptacle to said expansion valve, means for connecting said expansion valve with said cooling coils for supplying expanded refrigerant thereto, and means for propelling air from the bottom of said casing upwardly around said cooling coils and through the outlet at the top of the casing.

4. An evaporator unit comprising a cylindrical casing having an enlarged bottom portion, a fan rotatably mounted in said enlarged portion, means for driving said fan, cooling coils in said casing above said enlarged portion, a receptacle for refrigerant in said casing surrounded by said cooling coils, a funnel-shaped member on top of said casing defining an outlet for said casing, and an expansion valve in said funnel-shaped member in communication with said coils and said receptacle.

5. An evaporator unit adapted to be mounted behind the dashboard of an automotive vehicle comprising a tubular casing having an enlarged bottom portion provided with a free open end, a fan rotatably mounted in said enlarged bottom portion, a moisture catching trough formed around said bottom portion in close proximity to said fan, means for draining said trough, a receptacle for refrigerant mounted above said fan in said casing, cooling coils in said casing wound around said receptacle, a funnel-shaped member secured to the top of said casing defining an outlet therefor, and an expansion valve in said funnel-shaped member in communication with said cooling coils and said receptacle.

6. An evaporator and dehydrator unit for air conditioning systems comprising a container for liquid refrigerant, a strainer disposed across the top portion of said container, dehydrating material supported on top of said strainer, means for supplying liquid refrigerant to the top of said receptacle for flowing through said dehydrating material into the bottom portion of the receptacle, cooling coils disposed around said receptacle, means for expanding refrigerant from said receptacle into said cooling coils, and means defining a passageway for air over said cooling coils.

7. An evaporator unit of the dry type comprising a casing having an air inlet and an air outlet, a fan rotatably mounted in said inlet, cooling coils in said casing above said fan, means for collecting moisture that drips from said cooling coils, a receptacle for liquid refrigerant in said casing, means for supplying liquid refrigerant to said receptacle, an expansion valve in said casing, means for feeding refrigerant from said receptacle through said expansion valve, means connecting the low pressure side of said expansion valve to said cooling coils, and a filler pipe communicating with said receptacle to permit replenishment of refrigerant therein.

8. An air cooling unit adapted to be mounted behind an automobile dashboard having an opening therethrough comprising a casing having an air inlet at the bottom thereof and an air outlet at the top thereof for communicating with the opening in the dashboard, a refrigerant receiver tank in said casing, cooling coils surrounding the receiver tank, an expansion valve on top of said tank in communication with the tank on the high side thereof and with the coils on the low side thereof and a fan in said casing impelling air around the cooling coils and expansion valve to be cooled by contact therewith and discharged in cooled condition through the opening in the dashboard.

RALPH F. PEO.